Patented Sept. 6, 1932

1,876,214

UNITED STATES PATENT OFFICE

ARNOLD FAITELOWITZ, OF BERLIN, GERMANY, ASSIGNOR TO LUDWIG MAX LIPPMANN

METHOD FOR EXTRACTING THE NICOTINE FROM TOBACCO

No Drawing. Application filed October 23, 1930, Serial No. 490,827, and in Germany February 25, 1930.

The object of the invention is an improvement in a method for extracting nicotine from tobacco.

There are already several methods known for extracting the nicotine from tobacco, according to which the nicotine is removed either mechanically by dissolving agents, by air-currents, by heating, by electric currents, or by oxygenations of different kinds. In not one of these known methods is a complete extraction of the nicotine obtained and by all of these methods the tobacco loses, in the same degree as it is freed from the nicotine, also the savoury nitrogen-compounds and the aromatic substances and in consequence its value for the smoker.

According to the method of the present invention, the tobacco is submerged in water for a long time, so that it is protected against the action of the air. By this procedure the total amount of nicotine is absorbed by the water, especially if it is acidified to a certain degree. In the extract made in this manner the nicotine will be split by the microbes contained in the extract and transformed into amino-bases.

The diminution of the nicotine occurring during the fermentation of the tobacco is probably caused by microbes. But during the fermentation those conditions which are necessary for the growth of the microbes are not and cannot be exactly observed. These conditions consist in the protection against the sun-light, in the maintenance of the temperatures favourable for the growth of the microbes—25–40° C.—and in the favourable concentration of the solutions.

According to the new method the tobacco will be covered by water a relatively short time, for instance for three hours, whereupon the extract is squeezed out and left as it is for several days under the indicated conditions, until the microbes have split the nicotine. The extract freed from the nicotine is then added again to the tobacco, whereupon the latter is dried.

According to another method the splitting of the nicotine may be accelerated by adding to the extract obtained by squeezing, still microbes, for instance an infusion of microbes of tobacco or of similar kinds of Solaneæs or of mixtures of such microbes or cultures of microbes having been obtained from ripe cheese. The time of action of the microbes may then be shortened considerably.

By using the above-described method, however, it is only possible to obtain a splitting of 60 to 70% of the nicotine.

A complete splitting of the nicotine to aminobases is obtained by the following method. The leaves of tobacco are extracted in known manner so that they will be free from nicotine. The lixiviated leaves are squeezed out, so that as little liquid as possible remains and the drying of the leaves may be effected in a short time. The leaves lixiviated in such a manner cannot be used for smoking, because they are deprived of the organic nitrogen-compounds by the lixiviation.

The extract containing the total quantity of the nicotine of the tobacco is now subjected to a fermentation at a temperature of 20–39° C., that is at a temperature which is the most favourable for the growth of the microbes.

Preferably during this fermentation the following conditions are to be observed:

(1) The lixiviation shall offer to the air a surface as great as possible and the depth of the layer of liquid shall not rise above 10 cm. The smaller the depth, the more rapidly the fermentation takes place. It is, however, also possible to carry on the fermentation in thicker layers when an artificial aeration is provided for. As an example, the air may be made to rise in the liquid in finely divided bubbles.

(2) The free amino-bases generated in the extract after 12 or 24 hours by the splitting of the nicotine must be neutralized at times by acid or carbonic-hydrates, forming acid during the fermentation, so that the extract having become alkaline again becomes acid to a certain degree. If a continuous neutralization does not take place, the fermentation stops prematurely, so that the extract still contains nicotine.

A special acceleration of the fermentation is accomplished if the extract is vaccinated with cultivated microbes having been obtained from ripening cheese. When the extract has become totally free from nicotine, it is concentrated at a temperature of 60° C. for 15 minutes. Now the leaves of tobacco are again brought together with the concentrated extract being totally free from nicotine and dried in the air. In this manner a tobacco is obtained which is absolutely free from nicotine and containing as much nitrogen as before the fermentation. A series of experiments has shown that with the described method of fermentation only amino-bases are generated at the cost of the nicotine.

Examples (1). A tobacco of inferior quality, smelling somewhat mouldy is used as the material to be treated. The contents of nicotine is 1,5%. 200 gr. of this tobacco is mixed with 1000 gr. of water and left standing for 2 days. Then the tobacco is taken out of the liquid and dried on a large surface after the extract has been squeezed out. The extract stands 5 days, whereupon it is brought together again with the tobacco and the latter is finally dried. The contents of nicotine is then only 0,45%.

2). 100 gr. of leaves of tobacco (2,7% contents of nicotine) are so lixiviated that the leaves are absolutely free from nicotine. They are squeezed out and dried. The extract is then vaccinated with cultiviated microbes obtained from Swiss-cheese. The extract of about 1200 ccm. is then brought into a flat stone-vessel of 18 x 28 cm. area, so that the depth of the layer of extract is 2 cm. above the bottom of the vessel. Every 24 hours the free amino-bases generated at a temperature of 30° C. in the extract at the cost of the nicotine neutralized by a lactic acid of 10%.

After 8 days no nicotine could be found. The extract free from nicotine is then concentrated at a temperature of 60° C. within 15 minutes to 100 ccm. Then it is united with the tobacco and the latter dried in the air.

(3). 1000 gr. of leaves of tobacco (1,5% contents of nicotine) are extracted, until they are absolutely free from nicotine, then squeezed out and dried. The extract of about 12.000 ccm. is brought into a flat stone-vessel of an area of 30x40 cm., so that the depth of the layer of liquid is 10 cm. At a temperature of 30° C. every 24 hours the liquid having become alkaline is neutralized by tartaric acid of 20%.

After 3 weeks no nicotine could be found in the extract. The extract free from nicotine was then concentrated in the water-bath and brought together again with the tobacco, whereupon the latter was dried in the air.

The new method may be employed not only for rough tobacco, but also for articles of tobacco. It has the great advantage, to preserve the relish not only but still to increase the same.

What I claim is:

1. The method for extracting nicotine from tobacco which comprises lixiviating tobacco, squeezing out the extract from the tobacco, treating the extract with air to subject the extract to fermentation, neutralizing the amino-bases generating during the fermentation of the extract, and bringing the extract in contact again with the tobacco leaves after the total splitting of the nicotine.

2. The method for extracting nicotine from tobacco which comprises lixiviating tobacco, squeezing out the extract from the tobacco, treating the extract with air to subject the extract to fermentation, neutralizing the amino-bases generating during the fermentation of the extract, bringing the extract in contact again with the tobacco leaves after the splitting of the nicotine, and drying the leaves of tobacco in the air.

3. The method for extracting nicotine from tobacco which comprises lixiviating tobacco, squeezing out the extract from the tobacco, treating the extract with air to subject the extract to fermentation, neutralizing the amino-bases generating during the fermentation of the extract, by means of acids, and bringing the extract in contact again with the tobacco leaves after the splitting of the nicotine.

4. The method for extracting nicotine from tobacco which comprises lixiviating tobacco, squeezing out the extract from the tobacco, treating the extract with air to subject the extract to fermentation, neutralizing the amino-bases generating during the fermentation of the extract by means of carbonic-hydrates, and bringing the extract in contact again with the tobacco leaves after the splitting of the nicotine.

5. The method for extracting nicotine from tobacco which comprises lixiviating tobacco, squeezing out the extract from the tobacco, treating the extract with air to subject the extract to fermentation, neutralizing the amino-bases generating during the fermentation of the extract, and bringing the extract in contact again with the tobacco leaves.

In testimony whereof I have affixed my signature.

ARNOLD FAITELOWITZ.